United States Patent
Tingley

(10) Patent No.: US 9,737,171 B2
(45) Date of Patent: Aug. 22, 2017

(54) STAY-FLAT SHEET PAN

(71) Applicant: American Pan Company, Urbana, OH (US)

(72) Inventor: Jason Tingley, Beavercreek, OH (US)

(73) Assignee: American Pan Company, Urbana, OH (US)

( * ) Notice: Subject to any disclaimer, the term of this patent is extended or adjusted under 35 U.S.C. 154(b) by 118 days.

(21) Appl. No.: 14/825,767

(22) Filed: Aug. 13, 2015

(65) Prior Publication Data

US 2017/0042375 A1    Feb. 16, 2017

(51) Int. Cl.
*A47J 27/00* (2006.01)
*A47J 37/01* (2006.01)
*B21D 19/14* (2006.01)
*B21D 39/00* (2006.01)
*B21D 51/22* (2006.01)

(52) U.S. Cl.
CPC .............. *A47J 37/01* (2013.01); *B21D 19/14* (2013.01); *B21D 39/00* (2013.01); *B21D 51/22* (2013.01)

(58) Field of Classification Search
CPC ........... A47J 37/00; A47J 37/01; B21D 51/22; B21D 39/00; B21D 19/14; B65D 21/0233
USPC .... 220/573.1–573.5, 574, 574.1–574.3, 575, 220/23.83, 23.86–23.89, 23.9, 23.91, 220/23.2, 23.4, 23.6, 23.8, 220/495.01–495.11, 571, 571.1, 572, 573; 206/546, 499, 505, 514, 515–520
See application file for complete search history.

(56) References Cited

U.S. PATENT DOCUMENTS

| | | | | |
|---|---|---|---|---|
| 4,508,768 A * | 4/1985 | Kornely | ................ | A47J 36/022 206/516 |
| 5,644,976 A * | 7/1997 | Muchin | ................ | A47J 27/002 220/574 |
| 5,845,805 A * | 12/1998 | Ragland | ................... | A21B 3/13 220/573.1 |
| 6,065,629 A * | 5/2000 | Sarnoff | .................. | B65D 45/02 220/315 |
| 7,866,503 B2 * | 1/2011 | Liebzeit | .................. | A47J 27/16 220/573.1 |
| 2013/0341335 A1 * | 12/2013 | Sitabkhan | ............. | A47J 27/002 220/573.5 |
| 2014/0065278 A1 * | 3/2014 | Feriola | .................... | A47J 37/01 426/523 |

(Continued)

Primary Examiner — Kareen Thomas
(74) *Attorney, Agent, or Firm* — Frost Brown Todd LLC

(57) ABSTRACT

A sheet pan that includes a baking surface with an upwardly-extending tension bow formed therein that provides structural reinforcement to the baking surface; a sidewall portion surrounding the entire baking surface and defines an interior surface of the sheet pan and an exterior surface of the sheet pan, wherein the sidewall portion further includes a structural reinforcement rib formed therein, wherein the topmost region of the sidewall portion is rolled downward and away from the baking surface to form a rim having both an outside portion that defines the outer edge of the sheet pan, and an inside portion, and wherein the inside portion of the rim abuts the sidewall portion on the exterior surface of the sheet pan, and a reinforcing wire surrounding the upper region of the sidewall portion, wherein the wire is completely enclosed by and sealed within the rim, and wherein any significant open volume between the wire and the rim has been eliminated.

17 Claims, 2 Drawing Sheets

(56) References Cited

U.S. PATENT DOCUMENTS

2015/0136633 A1* 5/2015 Sarnoff ............... A47J 36/2405
206/499

* cited by examiner

STAY-FLAT SHEET PAN

BACKGROUND OF THE INVENTION

The present invention relates generally to pans or trays used in the production and preparation of baked goods or other food, and specifically to structurally reinforced and highly sanitary flat sheet pans for use in high-volume industrial baking applications.

For many years, flat sheet pans have been among the most commonly used baking pans by professional bakers and foodservice oriented companies. Applications and uses for flat sheet pans include the commercial production of baked goods (i.e., wholesale bakeries), quick-service food chains, and/or home use. Despite their effectiveness and utility, over time and with repeated use, these flat sheet pans typically fail and must be replaced due to a tendency of the bottom portion of the pan to bow down and a tendency of the perimeter of the pan to flare outward. Such use-related damage can significantly hinder performance, thereby necessitating replacement of the pan.

In addition to repeated-use related issues, another problem or weakness of flat sheet pans is lack of or insufficient sanitation. Nearly all commercially available sheet pans are manufactured with a metal reinforcement wire or band that is placed in the rim of the pan. This reinforcement wire is wrapped by and enclosed within the material of the pan and adds structural integrity that is required for heavy use. However, because the reinforcement wire is not sealed within the rim, corrosion or other contaminants that occur within the area of the non-sealed wire cannot be completely cleaned or removed, thereby creating a food-safety risk. This food-safety risk prevents flat sheet pans having this design from being certified by NSF International or from meeting other industry sanitation and food-safety standards.

NSF International is a global independent public health and environmental organization that provides standards development, product certification, testing, auditing, education and risk management services for public health and the environment. NSF uses the terms "certified" or "listed" in connection with a product, good, component, system, material, compound or ingredient. A product that is certified or listed means that NSF: (i) reviewed the product, most often through a sampling of the product; (ii) determined at the time of the review that the product complied with the relevant NSF consensus standard and/or protocol; and (iii) conducted or will conduct periodic audits to review whether the product continues to comply with the standard. After NSF certifies a product, the manufacturer of the product may use the NSF Mark on or in connection with the sale, use or distribution of that product. The NSF Mark conveys that an independent, third-party organization (NSF) has determined that the product complies with the relevant standard.

Thus, given the significant aforementioned deficiencies, there is an ongoing need for a structurally reinforced flat sheet pan that may be used for industrial/commercial purposes and that does not include design aspects that create sanitation concerns and prevent necessary or desirable certifications, such as NSF certification, from being obtained.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, a first flat sheet pan is provided. This flat sheet pan includes a baking surface that further includes an upwardly-extending tension bow formed therein that is operative to provide structural reinforcement to the baking surface; a sidewall portion surrounding the entire baking surface and defining an interior surface of the sheet pan and an exterior surface of the sheet pan, wherein the sidewall portion further includes a structural reinforcement rib formed therein, wherein the topmost region of the sidewall portion is rolled downward and away from the baking surface to form a rim having: an outside portion that defines the outer edge of the sheet pan, and an inside portion, and wherein the inside portion of the rim abuts the sidewall portion on the exterior surface of the sheet pan; and a band of material surrounding the upper region of the sidewall portion, wherein the band of material is operative to provide structural reinforcement to the sheet pan, wherein the band of material is completely enclosed by and sealed within the rim, and wherein any significant open volume between the band of material and the rim has been eliminated.

In accordance with another aspect of the present invention, a second flat sheet pan is provided. This flat sheet pan includes a baking surface that further includes an upwardly-extending tension bow formed therein that is operative to provide structural reinforcement to the baking surface; a sidewall portion surrounding the entire baking surface and defining an interior surface of the sheet pan and an exterior surface of the sheet pan, wherein the sidewall portion further includes a structural reinforcement rib formed therein, wherein the topmost region of the sidewall portion is rolled downward and away from the baking surface to form a rim having an outside portion that defines the outer edge of the sheet pan, and an inside portion, and wherein the inside portion of the rim abuts the sidewall portion on the exterior surface of the sheet pan; and a band of material surrounding the entire upper region of the sidewall portion, wherein the band of material is operative to provide structural reinforcement to the sheet pan, wherein the band of material is completely enclosed by and sealed within the rim by crimping the inside portion of the rim against the exterior surface of the sheet pan; and wherein any open volume between the band of material and the rim has been eliminated; and a release coating deposited on some or all of the surfaces of the sheet pan.

In yet another aspect of this invention, a method for making a flat sheet pan is provided. This method includes providing a piece of material having known dimensions; forming a baking surface in the piece of material; forming an upwardly extending tension bow in the baking surface, wherein the upwardly-extending tension bow is operative to provide structural reinforcement to the baking surface; forming a sidewall portion surrounding the entire baking surface, wherein the sidewall portion surrounds the entire baking surface and defines an interior surface of the sheet pan and an exterior surface of the sheet pan; forming a structural reinforcement rib in the sidewall portion; providing a band of material that surrounds the entire upper region of the sidewall portion above the structural reinforcement rib, wherein the band of material is operative to provide structural reinforcement to the sheet pan; rolling the topmost region of the sidewall portion downward and away from the baking surface to form a rim, having: an outside portion that defines the outer edge of the sheet pan, and an inside portion, wherein the inside portion of the rim abuts the sidewall portion on the exterior surface of the sheet pan; and completely enclosing the band of material within the rim by crimping the inside portion of the rim against the exterior surface of the sheet pan, and wherein completely enclosing the band of material within the rim by crimping the inside portion of the rim against the exterior surface of the sheet pan creates a seal that prevents contaminants from entering the interior of the rim.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DETAILED DESCRIPTION OF THE INVENTION

Figure 1:
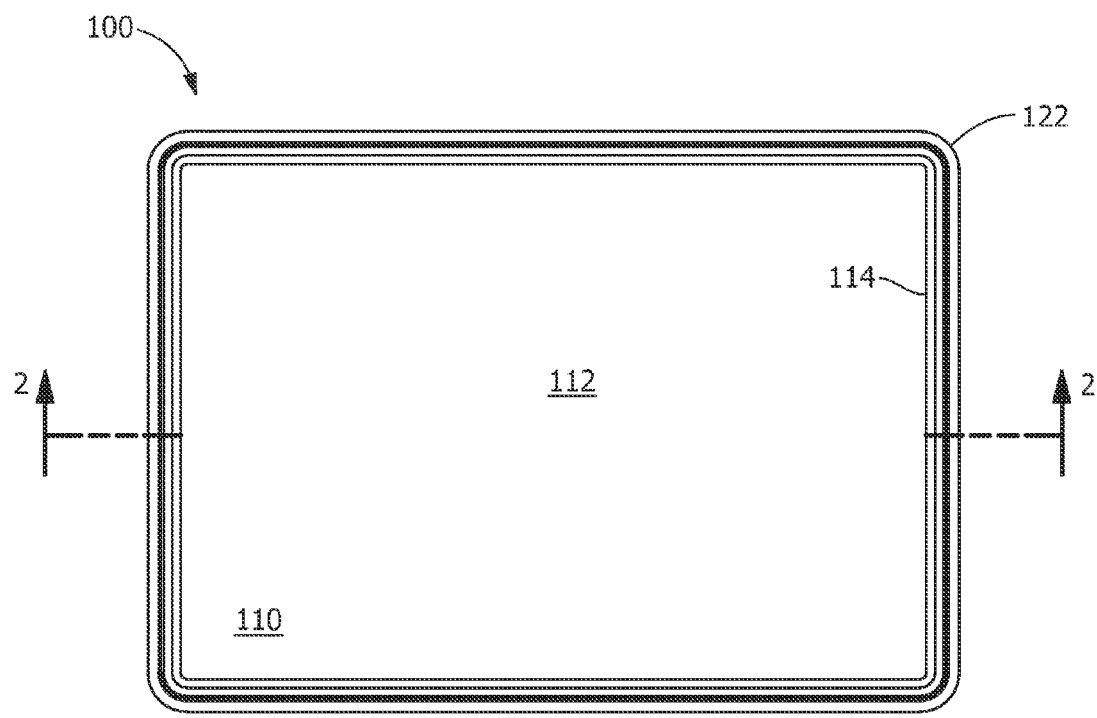
FIG. 1 is a top view of an exemplary embodiment of a substantially flat sheet pan in accordance with an exemplary embodiment of the present invention.

Exemplary embodiments of the present invention are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

The present invention relates generally to baking hardware, and more specifically to an industrial or commercial baking pan or tray that includes certain reinforcing features formed in the material of the pan itself for preventing warping and other stress-related damage. Exemplary embodiments of this invention provide structurally reinforced, durable baking trays or pans for use in high-volume industrial baking applications. The baking trays or pans of the present invention, which are referred to as "stay-flat sheet pans" include a substantially flat baking surface, a sidewall portion surrounding the baking surface, and a band of material surrounding the upper region of the sidewall, wherein the band of material is completely enclosed by and sealed within a rim that has been formed by rolling the topmost portion of the sidewall portion downward and away from the baking surface. The band of material is completely enclosed by and sealed within the rim by crimping the inside portion of the rim against the exterior surface of the sheet pan, thereby reducing or completely eliminating any open volume between the band of material and the rim/sidewall portion. An upwardly-extending tension bow is also formed in the baking surface for providing structural reinforcement to the baking surface, and a structural reinforcement rib is also typically formed in the sidewall portion.

Figure 2:
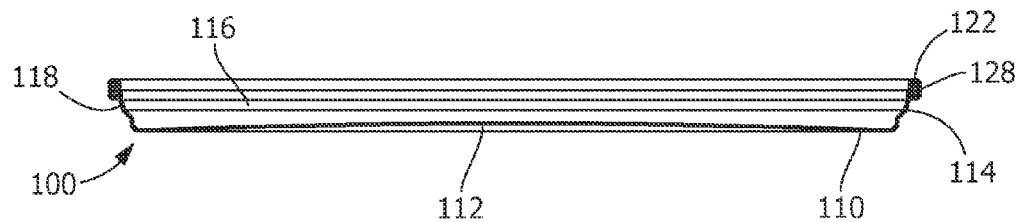
FIG. 2 is a cross-sectional side view of the flat sheet pan of FIG. 1.
Figure 3:
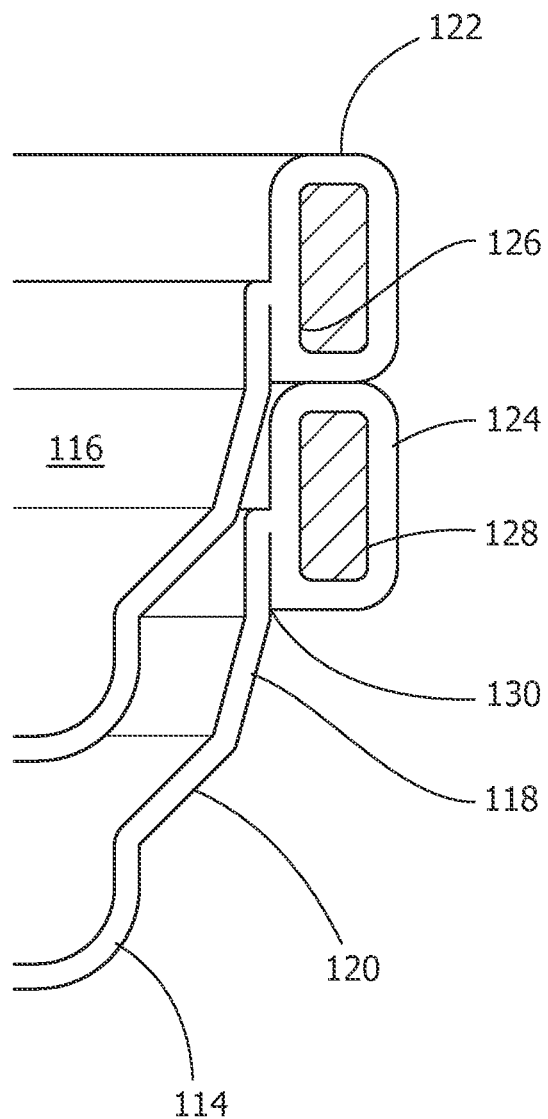
FIG. 3 is a partial cross-sectional side view of two sheet pans such as that shown in FIG. 1 illustrating the manner in which the sheet pans stack on top of one another.

With reference now to the Figures, FIG. 1 provides a top view of an exemplary embodiment of a flat sheet pan in accordance with an exemplary embodiment of the present invention, wherein the included design features strengthen and substantially increase the durability and lifespan of the sheet pan; FIG. 2 provides a cross-sectional side view of the sheet pan of FIG. 1; and FIG. 3 is a partial cross-sectional side view of two flat sheet pans such as that shown in FIG. 1 illustrating the manner in which the sheet pans stack on top of one another. As shown in FIGS. 1-3, sheet pan 100 includes baking surface 110, which further includes tension bow 112; sidewall portion 114, which defines interior 116 and exterior 118 of sheet pan 100; reinforcement rib 120, which is formed in the material of sidewall portion 114; rim 112, which is formed by rolling the topmost portion of sidewall portion 114 downward and away from baking surface 110, and which includes an outside portion 124 and an inside portion 126; wire or band or material 128, which is a piece of material that is separate from the material that forms baking surface 110 and sidewall portion 114 and that is completely enclosed within rim 122; and seal 130, which is formed by crimping the inside portion of rim 122 against the exterior surface of sheet pan 100 at sidewall portion 114.

Sheet pan 100 may be manufactured from aluminum panel, tin-plated steel, aluminized steel, carbonized steel, stainless steel, titanium, or combinations thereof. Band of material 128 may be manufactured from carbonized steel, aluminum, stainless steel, or combinations thereof or may simply be an aluminum flat wire band. The process of drawing, which may be used to fabricate sheet pan 100, involves forming the pan from a single sheet of material. Through a series of forming operation, the material is deformed or "drawn" to shape and define the various features at predetermined locations on the sheet. If so desired by the user of the baking tray, the tray may be covered or coated with certain materials, such as, for example, glazing material or other release coating materials common to the baking industry.

One aspect of the present invention includes a method for making a flat sheet pan, such as that shown in the Figures. An exemplary version of this method involves the following steps (not necessarily in the order listed): (i) providing a piece of material (e.g., metal) of known dimensions (e.g., 12.81 inches (325.4 mm)×17.81 inches (452.4 mm)); (ii) forming a baking surface in the piece of material; (iii) stretch-forming an upwardly extending tension bow in the baking surface by stretching the bottom of the baking surface across a concave male punch to create residual stress in the bottom of the pan; (iv) forming a sidewall portion surrounding the entire baking surface, wherein the sidewall portion surrounds the entire baking surface and defines an interior surface of the sheet pan and an exterior surface of the sheet pan; (v) forming a structural reinforcement rib in the sidewall portion; (vi) providing a band of material (or wire) that surrounds the entire upper region of the sidewall portion above the structural reinforcement rib, wherein the band of material is operative to provide structural reinforcement to the sheet pan; (vii) rolling the topmost region of the sidewall portion downward and away from the baking surface to form a rim; and (viii) completely enclosing the band of material within the rim by crimping the inside portion of the rim against the exterior surface of the sheet pan, wherein completely enclosing the band of material within the rim by crimping the inside portion of the rim against the exterior surface of the sheet pan eliminates any significant open volume between the band of material and the rim.

Forming upwardly extending tension bow 112 in baking surface 110 by stretching the bottom of baking surface 110 across a concave male punch creates residual stress in the bottom of sheet pan 100. The tension and upward bow (which may rise about 3/16 of an inch (about 0.5 cm) from the bottom perimeter of baking surface 110) resist both mechanical damage and bowing from thermal expansion during the baking process. Pans that are bowed downward (convexed) are difficult to transfer on conveyors because they are less stable and may rock and spin on any center low point in the pan bottom. Reinforcement rib 120 acts as a continuous strengthening rib that runs around the entire sidewall portion of the pan (114) and adds considerable resistance to pan bowing and twisting. Similar to the stretch-formed pan bottom, reinforcement rib 120 adds residual stress and a stronger geometry to sidewall portion 114. Testing has demonstrated that reinforcement rib 120 increases pan strength and resistance to perimeter bowing by at least 25%. Reinforcement rib 120 and tension bow 112 create a much more durable sheet pan that has the rigidity to "Stay-Flat" and hold its shape after many thermal and mechanical cycles. NSF certification for sheet pan 100 was obtained because sealed rim 122 (which includes zero open volume therein) prevents water and other contaminants from entering rim 122, thereby making sheet 100 a highly sanitary product.

While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the Applicant's general inventive concept.

What is claimed:

1. A sheet pan for baking, comprising:
   (a) a baking surface, wherein the baking surface further includes an upwardly-extending tension bow formed therein, and wherein the upwardly-extending tension bow is operative to provide structural reinforcement to the baking surface;
   (b) a sidewall portion surrounding the baking surface in its entirety and defining an interior surface of the sheet pan and an exterior surface of the sheet pan,
      (i) wherein the sidewall portion further includes a structural reinforcement rib formed therein,
      (ii) wherein the sidewall portion includes a topmost portion that is rolled downward and away from the baking surface to form a rim having:
         a) an outside portion that defines an outer edge of the sheet pan, and
         b) an inside portion, and
      (iii) wherein the inside portion of the rim abuts the sidewall portion on the exterior surface of the sheet pan; and
   (c) a band of material surrounding an upper region of the sidewall portion,
      (i) wherein the band of material is operative to provide structural reinforcement to the sheet pan,
      (ii) wherein the band of material is completely enclosed by and sealed within the rim, and
      (iii) wherein any open volume between the band of material and the rim has been eliminated.

2. The sheet pan of claim 1, wherein the sheet pan is manufactured from aluminum panel, tin-plated steel, aluminized steel, carbonized steel, stainless steel, titanium, or combinations thereof.

3. The sheet pan of claim 1, wherein the band of material is manufactured from carbonized steel, aluminum, stainless steel, or combinations thereof.

4. The sheet pan of claim 1, wherein the band of material is an aluminum flat wire band.

5. The sheet pan of claim 1, wherein the sheet pan further includes a release coating deposited on some or all of the surfaces thereof.

6. The sheet pan of claim 1, wherein the band of material is completely enclosed by and sealed within the rim by crimping the inside portion of the rim against the exterior surface of the sheet pan.

7. The sheet pan of claim 1, wherein the upwardly-extending tension bow is formed by stretching the bottom of the baking surface across a concaved male punch to create residual stress in the bottom of the pan.

8. A sheet pan for baking, comprising:
   (a) a baking surface, wherein the baking surface further includes an upwardly-extending tension bow formed therein, and wherein the upwardly-extending tension bow is operative to provide structural reinforcement to the baking surface;
   (b) a sidewall portion surrounding the baking surface in its entirety and defining an interior surface of the sheet pan and an exterior surface of the sheet pan,
      (i) wherein the sidewall portion further includes a structural reinforcement rib formed therein,
      (ii) wherein the sidewall portion includes a topmost portion that is rolled downward and away from the baking surface to form a rim having:
         a) an outside portion that defines an outer edge of the sheet pan, and
         b) an inside portion, and
      (iii) wherein the inside portion of the rim abuts the sidewall portion on the exterior surface of the sheet pan; and
   (c) a band of material surrounding an upper region of the sidewall portion in its entirety,
      (i) wherein the band of material is operative to provide structural reinforcement to the sheet pan,
      (ii) wherein the band of material is completely enclosed by and sealed within the rim by crimping the inside portion of the rim against the exterior surface of the sheet pan; and
      (iii) wherein any open volume between the band of material and the rim has been eliminated; and
   (d) a release coating deposited on some or all of the surfaces of the sheet pan.

9. The sheet pan of claim 8, wherein the sheet pan is manufactured from aluminum panel, tin-plated steel, aluminized steel, carbonized steel, stainless steel, titanium, or combinations thereof; and wherein the band of material is manufactured from carbonized steel, aluminum, stainless steel, or combinations thereof.

10. The sheet pan of claim 8, wherein the band of material is an aluminum flat wire band.

11. The sheet pan of claim 8, wherein the upwardly-extending tension bow is formed by stretching the bottom of the baking surface across a concaved male punch to create residual stress in the bottom of the pan.

12. A method for making a flat sheet pan, comprising:
   (a) providing a piece of material having known dimensions;
   (b) forming a baking surface in the piece of material;
   (c) forming an upwardly extending tension bow in the baking surface, wherein the upwardly-extending tension bow is operative to provide structural reinforcement to the baking surface;
   (d) forming a sidewall portion surrounding the entire baking surface, wherein the sidewall portion surrounds the entire baking surface and defines an interior surface of the sheet pan and an exterior surface of the sheet pan;
   (e) forming a structural reinforcement rib in the sidewall portion;
   (f) providing a band of material that surrounds the entire upper region of the sidewall portion above the structural reinforcement rib, wherein the band of material is operative to provide structural reinforcement to the sheet pan;
   (g) rolling the topmost region of the sidewall portion downward and away from the baking surface to form a rim, having:
      (i) an outside portion that defines the outer edge of the sheet pan, and
      (ii) an inside portion, wherein the inside portion of the rim abuts the sidewall portion on the exterior surface of the sheet pan; and
   (h) completely enclosing the band of material within the rim by crimping the inside portion of the rim against the exterior surface of the sheet pan, and wherein completely enclosing the band of material within the rim by crimping the inside portion of the rim against the exterior surface of the sheet pan creates a seal that prevents contaminants from entering the interior of the rim.

13. The method of claim 12, wherein the piece of material is metal.

14. The method of claim 12, wherein the sheet pan is manufactured from aluminum panel, tin-plated steel, aluminized steel, carbonized steel, stainless steel, titanium, or combinations thereof.

15. The method of claim 12, wherein the band of material is manufactured from carbonized steel, aluminum, stainless steel, or combinations thereof.

16. The method of claim 12, wherein the band of material is an aluminum flat wire band.

17. The method of claim 12, wherein the sheet pan further includes a release coating deposited on some or all of the surfaces thereof.

* * * * *